(12) United States Patent
Huang et al.

(10) Patent No.: US 10,948,972 B2
(45) Date of Patent: Mar. 16, 2021

(54) DATA STORAGE APPARATUS AND OPERATION METHOD THEREOF

(71) Applicant: Acer Incorporated, New Taipei (TW)

(72) Inventors: Yi-Jhong Huang, New Taipei (TW); Tz-Yu Fu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/438,846

(22) Filed: Jun. 12, 2019

(65) Prior Publication Data

US 2019/0384375 A1   Dec. 19, 2019

(30) Foreign Application Priority Data

Jun. 13, 2018   (TW) .................................. 107120414

(51) Int. Cl.
| | | |
|---|---|---|
| *G06F 12/02* | (2006.01) | |
| *G06F 1/3234* | (2019.01) | |
| *G06F 3/06* | (2006.01) | |
| *G06F 1/3228* | (2019.01) | |

(52) U.S. Cl.
CPC .......... *G06F 1/3275* (2013.01); *G06F 1/3228* (2013.01); *G06F 3/0658* (2013.01); *G06F 3/0679* (2013.01); *G06F 12/0246* (2013.01)

(58) Field of Classification Search
CPC ......... G06F 12/0246; G06F 2212/7201; G06F 3/0679; G06F 2212/7205; G06F 3/064; G06F 2212/1044; G06F 2212/1036; G06F 3/0658; G06F 1/3275; G06F 3/0625; G06F 1/3228; G06F 3/0634; G06F 3/658
USPC ....................................................... 711/103
See application file for complete search history.

(56) References Cited

U.S. PATENT DOCUMENTS

| | | | | |
|---|---|---|---|---|
| 6,405,295 | B1 * | 6/2002 | Bando ................. | G06F 12/0246 711/103 |
| 8,904,092 | B2 * | 12/2014 | Tucek ................. | G06F 12/0238 711/103 |
| 2010/0169597 | A1 * | 7/2010 | Yonezawa ........... | G06F 12/0246 711/162 |
| 2015/0121033 | A1 * | 4/2015 | Higeta ................ | G06F 12/0246 711/207 |
| 2018/0239547 | A1 * | 8/2018 | Inbar .................... | G06F 12/0246 |

\* cited by examiner

*Primary Examiner* — Hashem Farrokh
(74) *Attorney, Agent, or Firm* — Birch, Stewart, Kolasch & Birch, LLP

(57) ABSTRACT

The present invention discloses a data storage apparatus and an operation method thereof. The data storage apparatus includes a non-volatile memory, a volatile memory coupled to the non-volatile memory, and a memory controller coupled to the non-volatile memory and the volatile memory. The memory controller is configured to perform following operations: receiving a modern standby notification from a host; and updating a second mapping table stored in the non-volatile memory according to a number of flags and a first mapping table stored in the volatile memory.

6 Claims, 2 Drawing Sheets

DATA STORAGE APPARATUS AND OPERATION METHOD THEREOF

This application claims the benefit of Taiwan application Serial No. 107120414, filed Jun. 13, 2018, the subject matter of which is incorporated herein by reference.

BACKGROUND OF THE INVENTION

Field of the Invention

The invention relates in general to a data storage apparatus and an operation method thereof.

Description of the Related Art

Along with the development in technology, various electronic devices such as mobile phone, tablet, personal computer, and notebook computer are widely used in modern people's daily life. To meet peoples' different requirements, the function of the electronic device becomes more and more diversified. Since power consumption increases when the electronic device works, the user wishes that power consumption can be reduced as much as possible when the electronic device is in a standby mode, such that battery duration can be prolonged. However, the user also wishes that the electronic device still performs some specific functions, such as updating the hardware, the software or the firmware or receiving instant messages or e-mails, when the electronic device is in the standby mode. In response to the above needs, the Microsoft Corporation provides a new standby mode: a modern standby mode. In comparison to the traditional standby mode (also referred as "S3 mode"), the electronic device in the modern standby mode still can be connected to the network, and can receive messages or data via the network. However, there are some differences between the modern standby mode and the traditional standby mode. For an electronic device to effectively support the modern standby mode, the operation of some internal devices (such as a data storage apparatus) of the electronic device needs to be adjusted.

When the electronic device (such as a notebook computer) is in the modern standby mode, the data storage apparatus (such as a solid state disc) of the electronic device will repeatedly enter a low power consumption mode. That is, the data storage apparatus in the modern standby mode will frequently switch between the ordinary mode and the low power consumption mode. When the data storage apparatus enter the low power consumption mode from the ordinary mode, the memory controller of the data storage apparatus will write the complete L2P mapping table stored in the volatile memory of the data storage apparatus to the non-volatile memory of the data storage apparatus to avoid important data being lost when the power is interrupted in the low power consumption mode. When the data storage apparatus is awakened and enters the ordinary mode from the low power consumption mode, the memory controller of the data storage apparatus will again write the complete L2P mapping table stored in the non-volatile memory of the data storage apparatus to the non-volatile memory of the data storage apparatus (also referred as "loading"). In the modern standby mode, since the memory controller needs to frequently write the complete L2P mapping table to the non-volatile memory, the volume of the data that need to be written increases greatly, and the lifespan of the non-volatile memory will be shortened.

Therefore, how to reduce the volume of the data that need to be written under the modern standby mode when the data storage apparatus enters the low power consumption mode from the ordinary mode has become a prominent task for the industries.

SUMMARY OF THE INVENTION

The present invention discloses a data storage apparatus and an operation method thereof.

According to one embodiment of the present invention, a data storage apparatus including a non-volatile memory, a volatile memory, and a memory controller is provided. The volatile memory is coupled to the non-volatile memory. The memory controller is coupled to the non-volatile memory and the volatile memory. The memory controller is configured to perform following operations: receiving a modern standby notification from a host; and updating a second mapping table stored in the non-volatile memory according to a plurality of flags and a first mapping table stored in the volatile memory. The flags correspond to a plurality of logic block numbers of the first mapping table. When a physical block number corresponding to any logic block number of the first mapping table is changed, the memory controller sets the flag corresponding to the any logic block number to a second value from a first value and writes the part of the first mapping table whose corresponding flags have the second value to the non-volatile memory.

According to another embodiment of the present invention, an operation method of a data storage apparatus is provided. When the operation method is performed by a memory controller of the data storage apparatus, the memory controller is configured to perform following operations: receiving a modern standby notification from a host; and updating a second mapping table stored in a non-volatile memory of the data storage apparatus according to a plurality of flags and a first mapping table stored in a volatile memory of the data storage apparatus. The flags correspond to a plurality of logic block numbers of the first mapping table. When a physical block number corresponding to any logic block number of the first mapping table is changed, the memory controller sets the flag corresponding to the any logic block number to a second value from a first value and writes the part of the first mapping table whose corresponding flags have the second value to the non-volatile memory.

The data storage apparatus and the operation method thereof of the present disclosure effectively reduce the volume of the data that need to be written when the mapping table is refreshed. Particularly, under the circumstance that the data storage apparatus is in a standby mode and is frequently switched between an ordinary state and a low power consumption state, the present disclosure effectively reduces the volume of the data that need to be written when the mapping table is refreshed, and therefore prolongs the lifespan of the non-volatile memory of the data storage apparatus.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
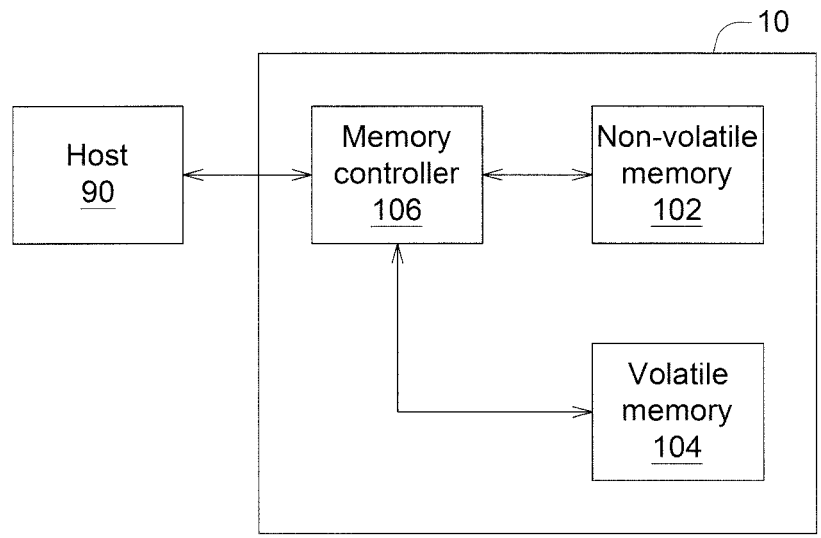
FIG. 1 is a functional block diagram of a data storage apparatus according to an embodiment of the present invention.

Referring to FIG. 1, a functional block diagram of a data storage apparatus according to an embodiment of the present invention is shown. The data storage apparatus 10 includes a non-volatile memory 102, a volatile memory 104 and a memory controller 106.

The non-volatile memory 102 can be realized by an NAND flash or an NOR flash. The volatile memory 104 can be realized by a double data rate (DDR) memory or a low voltage double data rate (DDRL) memory. The memory controller 106, which can be realized by an electronic element, such as a microprocessor, a microcontroller, a DSP, or an ASIC, is configured to transmit, receive, read, program, erase or store data with the non-volatile memory 102 and the volatile memory 104.

The non-volatile memory 102 may include one or more than one logical unit number (LUN), and can be selected or enabled by a chip enable (CE) signal. Each logical unit number may include multiple planes. Each plane may include multiple blocks.

The memory controller 106 can be coupled to a host 90, such as a personal computer, a mobile phone, a PC tablet, a car system or a navigation device, via a cabled or a wireless communication interface (not illustrated), such as an SATA, a PCIe, or an Ethernet. The memory controller 106 can receive a data access instruction or a notification, such as a read instruction or a write instruction, from the host 90. For example, the memory controller 106, in response to the read instruction or the write instruction received from the host 90, performs a read operation or a write operation to one or more than one specific physical block or physical address of the non-volatile memory 102.

In an embodiment, the non-volatile memory 102 has a logical to physical (L2P) mapping table for recording the correspondence relationship between the logical blocks and the physical blocks of the non-volatile memory 102. Generally speaking, when the host 90 wants to access a specific data from the non-volatile memory 102, the data access instruction sent by the host 90 may include a logical address which represents the storage address of a specific data known to the host 90. The storage address may be different from the physical address of the specific data stored in the non-volatile memory 102. When the memory controller 106 receives a data access instruction from the host 90, the memory controller 106 firstly converts the logical address into the physical address according to the L2P mapping table, and then accesses the specific data according to the physical address. It should be noted that since the correspondence relationship between the logical blocks and the physical blocks normally changes during the operation of the data storage apparatus 10, the memory controller 106 writes the L2P mapping table (also referred as "loading") to the volatile memory 104 to increase the processing speed. For the description of the present invention to be understood more easily, here below, the L2P mapping table stored in the volatile memory 104 is referred as the first mapping table, and the L2P mapping table stored in the non-volatile memory 102 is referred as the second mapping table.

Figure 2:
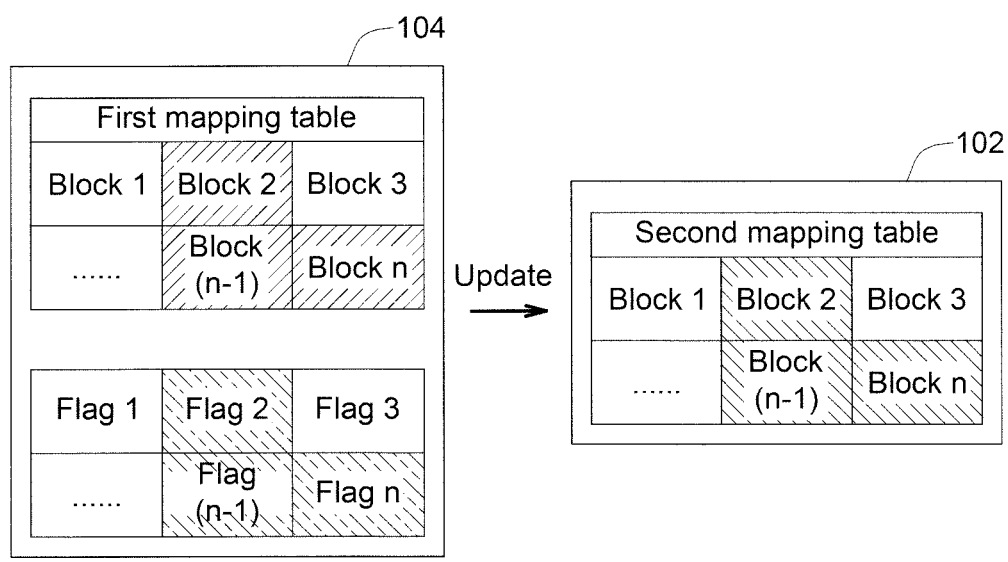
FIG. 2 is a schematic diagram of a first mapping table, a second mapping table and flags according to an embodiment of the present invention.

Referring to FIG. 2, a schematic diagram of a first mapping table, a second mapping table and flags according to an embodiment of the present invention is shown. As indicated in FIG. 2, the first mapping table and the second mapping table both include multiple fields of logic block numbers, and each field is for recording the physical block number corresponding to the logic block number. For example, the field of the logic block number Block 1 is for recording the physical block number corresponding to the logic block number Block 1, and the rest can be obtained by the same analogy. In the present example, suppose that the physical block numbers recorded in the fields of the logic block numbers Block 2, Block (n−1) and Block n of the first mapping table change during the operation of the data storage apparatus 10, such that the first mapping table is different from the second mapping table in terms of the fields of the logic block numbers Block 2, Block (n−1) and Block n. Detailed description of the flags is disclosed later.

Figure 3:
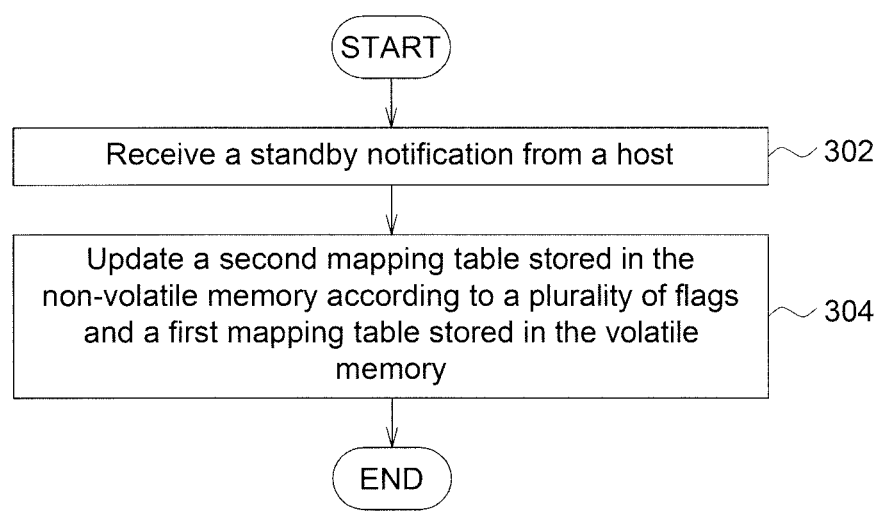
FIG. 3 is a flowchart of an operation method of a data storage apparatus according to an embodiment of the present invention.

Referring to FIG. 3, a flowchart of an operation method of a data storage apparatus according to an embodiment of the present invention is shown. The operation method of the present disclosure can be performed by the memory controller 106. To be more specifically, the present operation method can be realized by a firmware code and programmed in the memory controller 106.

In step 302, the memory controller 106 receives a standby notification from the host 90. When the host 90 is about to enter a standby mode, the host 90 will emit a standby notification for switching the data storage apparatus 10 to a standby mode and controlling the data storage apparatus 10 to enter a second state from a first state. The standby mode can be a modern standby mode; the first state is an ordinary state; the second state is a low power consumption state. In the ordinary state, the host 90 provides a power to the data storage apparatus 10, such that the data storage apparatus 10 can perform operations such as write, read, and erase. In the low power consumption state, the host 90 decreases or stops providing a power to the data storage apparatus 10, such that the data storage apparatus 10 can maintain data correctness for the non-volatile memory 102. When the data storage apparatus 10 enters the low power consumption state, the data buffered in the volatile memory 104 will be lost due to the absence of power. Under the standby mode, the host 90 determines whether to decrease or stop providing a power to the data storage apparatus 10 according to whether to access data from the data storage apparatus 10. In an embodiment, under the standby mode, the host 90, when accessing data from the data storage apparatus 10, sends a wake-up notification to the data storage apparatus 10 for controlling the data storage apparatus 10 to enter the ordinary state from the low power consumption state. The host 90, after accessing data from the data storage apparatus 10, again sends the standby notification to the data storage apparatus 10 and controls the data storage apparatus 10 to enter the low power consumption state form the ordinary state. In other words, when the data storage apparatus 10 is not in the standby mode, the data storage apparatus 10, in response to the standby notification, switches to the standby mode and enters the low power consumption state from the ordinary state. In the standby mode, the data storage apparatus 10 enters the low power consumption state from the ordinary state in response to the standby mode, and enters the ordinary state from the low power consumption state in response to the wake-up notification.

In step 304, the memory controller 106 updates the second mapping table stored in the non-volatile memory 102 according to a plurality of flags and the first mapping table stored in the volatile memory 104. As indicated in FIG. 3, the flags can be recorded in a flag table, wherein each flag corresponds to a logic block number of the first mapping table. For example, the flag Flag 1 corresponds to (the field of) the logic block number Block 1, the flag Flag 2 corresponds to (the field of) the logic block number Block 2, and the rest can be obtained by the same analogy. When a physical block number corresponding to any logic block number of the first mapping table is changed, the memory controller 106 sets the flag corresponding to the any logic block number to a second value (such as "1") from a first value (such as "0"). Let FIG. 3 be taken for example. The flags Flag 2, Flag (n−1) and Flag n corresponding to the logic block numbers Block 2, Block (n−1) and Block n are set to the second value from the first value by the memory controller 106. The memory controller 106, after receiving the modern standby notification, writes the fields of the logic block numbers whose corresponding flags are set to the second value to the non-volatile memory 102 to update (also referred as "refreshing") the second mapping table. Let FIG. 2 be taken for example. The memory controller 106 writes the contents of the fields of the logic block numbers Block 2, Block (n−1) and Block n to the non-volatile memory 102. In other words, the memory controller 106 marks with flags the part of the logic block numbers of the first mapping table whose corresponding physical block numbers have changed and writes the same part of the logic block numbers of the first mapping table to the non-volatile memory 102 before the data storage apparatus 10 enters the modern standby mode. In an embodiment, step 304 is completed before the data storage apparatus 10 enters the low power consumption state.

When the host 90 wants to access data from the data storage apparatus 10, the host 90 resumes power supply to the data storage apparatus 10 and sends a wake-up notification to the data storage apparatus 10 for controlling the data storage apparatus 10 to enter the ordinary state from the low power consumption state. The memory controller 106, after receiving the wake-up notification, writes the second mapping table to the volatile memory 104 and performs subsequent operations. All flags are set to the first value.

In an embodiment, the flags are stored in the volatile memory 104. In another embodiment, the flag can be stored in a working memory (volatile memory) of the memory controller 106.

The data storage apparatus and the operation method thereof of the present disclosure effectively reduce the volume of the data that need to be written when the mapping table is refreshed. Particularly, under the circumstance that the data storage apparatus is in a standby mode and is frequently switched between an ordinary state and a low power consumption state, the present disclosure effectively reduces the volume of the data that need to be written when the mapping table is refreshed, and therefore prolongs the lifespan of the non-volatile memory of the data storage apparatus.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data storage apparatus, comprising:
a non-volatile memory;
a volatile memory coupled to the non-volatile memory; and
a memory controller coupled to the non-volatile memory and the volatile memory and configured to perform following operations:
receiving a standby notification from a host; and
updating a second mapping table stored in the non-volatile memory according to a plurality of flags and a first mapping table stored in the volatile memory;
wherein the flags correspond to a plurality of logic block numbers of the first mapping table, and when a physical block number corresponding to any logic block number of the first mapping table is changed, the memory controller sets the flag corresponding to the any logic block number to a second value from a first value and writes the a part of the first mapping table whose corresponding flags have the second value to the non-volatile memory, and
wherein when the memory controller receives a wake-up notification from the host, the memory controller writes the second mapping table to the volatile memory and resets the flags to the first value.

2. The data storage apparatus according to claim 1, wherein the flags are recorded in a flag table.

3. The data storage apparatus according to claim 1, wherein the flags are stored in the non-volatile memory or a working memory of the memory controller.

4. An operation method of a data storage apparatus, wherein the data storage apparatus comprises a non-volatile memory, a volatile memory and a memory controller, and the operation method is performed by the memory controller and comprises:
receiving a standby notification from a host; and
updating a second mapping table stored in the non-volatile memory according to a plurality of flags and a first mapping table stored in the volatile memory;
wherein the flags correspond to a plurality of logic block numbers of the first mapping table, and when a physical block number corresponding to any logic block number of the first mapping table is changed, the memory controller sets the flag corresponding to the any logic block number to a second value from a first value and writes the a part of the first mapping table whose corresponding flags have the second value to the non-volatile memory, and
wherein when the memory controller receives a wake-up notification from the host, the memory controller writes the second mapping table to the volatile memory and resets the flags to the first value.

5. The operation method according to claim 4, wherein the flags are recorded in a flag table.

6. The operation method according to claim 4, wherein the flags are stored in the non-volatile memory or a working memory of the memory controller.

* * * * *